US010710506B2

United States Patent
Nemeth et al.

(10) Patent No.: US 10,710,506 B2
(45) Date of Patent: Jul. 14, 2020

(54) VEHICLE WITH SURROUNDINGS-MONITORING DEVICE AND METHOD FOR OPERATING SUCH A MONITORING DEVICE

(71) Applicant: KNORR-BREMSE Systeme fuer Nutzfahrzeuge GmbH, Munich (DE)

(72) Inventors: Huba Nemeth, Budapest (HU); Marton Gyoeri, Budapest (HU); Adam Szoelloesi, Debrecen (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 558 days.

(21) Appl. No.: 15/384,815

(22) Filed: Dec. 20, 2016

(65) Prior Publication Data
US 2017/0166132 A1 Jun. 15, 2017

Related U.S. Application Data

(63) Continuation of application No. PCT/EP2015/063000, filed on Jun. 11, 2015.

(30) Foreign Application Priority Data

Jun. 20, 2014 (DE) .......... 10 2014 108 684

(51) Int. Cl.
*H04N 7/18* (2006.01)
*B60R 1/00* (2006.01)
(Continued)

(52) U.S. Cl.
CPC ............... *B60R 1/002* (2013.01); *B60R 1/00* (2013.01); *B60R 11/04* (2013.01);
(Continued)

(58) Field of Classification Search
CPC . G06T 2207/10004; G06T 2207/30252; G06T 7/73; G06T 7/80; H04N 17/002; H04N 5/23229; H04N 5/247
See application file for complete search history.

(56) References Cited

U.S. PATENT DOCUMENTS 6,923,080 B1 * 8/2005 Dobler .................. B60R 1/00
348/E7.086
8,094,182 B2 1/2012 Park et al.
(Continued)

FOREIGN PATENT DOCUMENTS

| CN | 101030316 A | 9/2007 |
| CN | 101080004 A | 11/2007 |

(Continued)

OTHER PUBLICATIONS

International Preliminary Report on Patentability (PCT/IB/338 & PCT/IB/373) issued in PCT Application No. PCT/EP2015/063000 dated Dec. 29, 2016, including English translation of document C2 (German-language Written Opinion (PCT/ISA/237)) previously filed on Dec. 20, 2016 (Ten (10) pages).

(Continued)

*Primary Examiner* — Obafemi O Sosanya
(74) *Attorney, Agent, or Firm* — Crowell & Moring LLP

(57) ABSTRACT

A vehicle with a surroundings-monitoring device contains an image-capturing device with two cameras and records surroundings images of the vehicle. A first camera is arranged in the region of a first edge of the vehicle, at which edge a first vehicle side face and a vehicle front face or a vehicle rear face abut one another. A second camera is arranged in the region of a second edge of the vehicle, which differs from the first edge, and at which a second vehicle side face which differs from the first vehicle side face and the vehicle front face or the vehicle rear face abut one another. The first camera device is arranged such that the image- (Continued)

detection region of the first camera includes at least part of the surroundings of the first vehicle side face and at least part of the surroundings of the vehicle front face or at least part of the surroundings of the vehicle rear face, and the image-detection region of the second camera includes at least part of the surroundings of the second vehicle side face and at least part of the surroundings of the vehicle front face or at least part of the surroundings of the vehicle rear face.

15 Claims, 12 Drawing Sheets

(51) Int. Cl.
  *G08G 1/16* (2006.01)
  *G06K 9/00* (2006.01)
  *G06T 3/40* (2006.01)
  *B60R 11/04* (2006.01)
  *H04N 5/247* (2006.01)

(52) U.S. Cl.
  CPC ..... *G06K 9/00791* (2013.01); *G06K 9/00805* (2013.01); *G06T 3/4038* (2013.01); *G08G 1/16* (2013.01); *H04N 5/247* (2013.01); *H04N 7/181* (2013.01); *B60R 2300/105* (2013.01); *B60R 2300/107* (2013.01); *B60R 2300/303* (2013.01); *B60R 2300/607* (2013.01); *B60R 2300/70* (2013.01); *B60R 2300/802* (2013.01); *G06T 2200/32* (2013.01)

(56) References Cited

U.S. PATENT DOCUMENTS

| | | |
|---|---|---|
| 2007/0273764 A1 | 11/2007 | Yamada et al. |
| 2008/0205706 A1 | 8/2008 | Hongo |
| 2013/0113923 A1 | 5/2013 | Chien et al. |
| 2013/0147958 A1 | 6/2013 | Mitsuta et al. |
| 2015/0278610 A1 | 10/2015 | Renner et al. |
| 2015/0286878 A1* | 10/2015 | Molin ............... G06K 9/20 348/148 |
| 2017/0166132 A1 | 6/2017 | Nemeth et al. |

FOREIGN PATENT DOCUMENTS

| | | |
|---|---|---|
| CN | 101256073 A | 9/2008 |
| DE | 100 35 223 A1 | 1/2002 |
| DE | 10 2008 035 428 B4 | 11/2010 |
| DE | 10 2011 077 143 A1 | 12/2012 |
| DE | 10 2011 088 332 A1 | 6/2013 |
| DE | 10 2012 014 448 A1 | 1/2014 |
| DE | 10 2012 215 322 A1 | 3/2014 |
| EP | 1 302 076 B1 | 5/2008 |
| EP | 1 968 011 A2 | 9/2008 |
| EP | 2 133 237 A1 | 12/2009 |
| EP | 2 375 376 A1 | 10/2011 |
| EP | 2 133 237 B1 | 3/2015 |
| JP | 2010-287029 A | 12/2010 |
| TW | 201319520 A | 5/2013 |
| WO | WO 2015/193158 A1 | 12/2015 |

OTHER PUBLICATIONS

International Search Report (PCT/ISA/210) issued in PCT Application No. PCT/EP2015/063000 dated Aug. 21, 2015 with English translation (Four (4) pages).

German-language Written Opinion (PCT/ISA/237) issued in PCT Application No. PCT/EP2015/063000 dated Aug. 21, 2015 (Six (6) pages).

German-language Office Action issued in counterpart German Application No. 10 2014 108 684.8 dated Feb. 4, 2015 (Seven (7) pages).

Chinese-language Office Action issued in counterpart Chinese Application No. 201580039918.X dated Oct. 31, 2018 with English translation (14 pages).

Chinese-language Office Action issued in counterpart Chinese Application No. 201580039918.X dated Apr. 23, 2019 with English translation (19 pages).

German-language third-party filing in a post-grant opposition proceeding in counterpart European Application No. 15729421.6 dated Dec. 3, 2019 (52 pages).

* cited by examiner

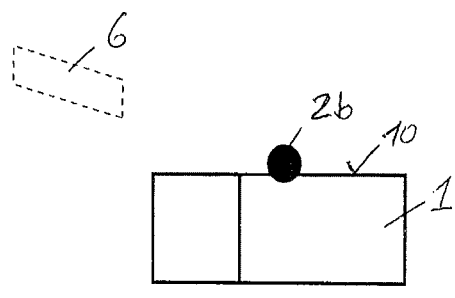
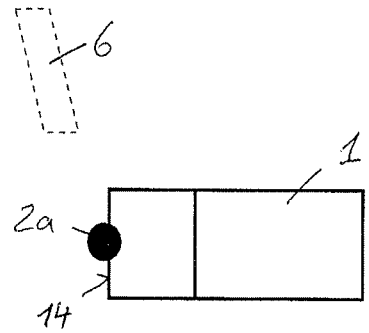
Fig. 6A                Fig. 6B
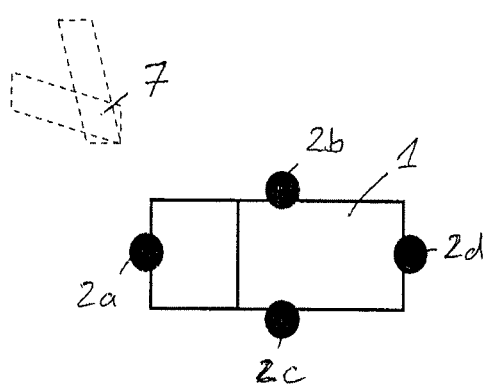
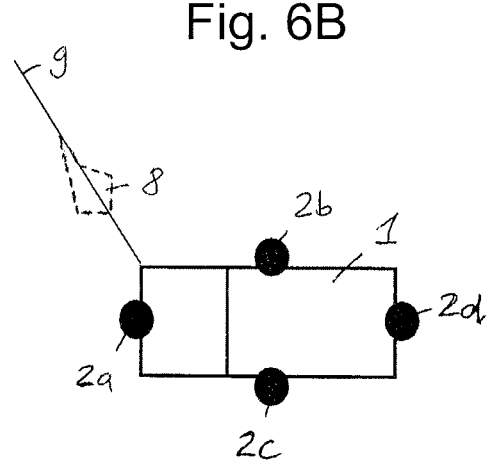
Fig. 6C                Fig. 6D
Prior Art

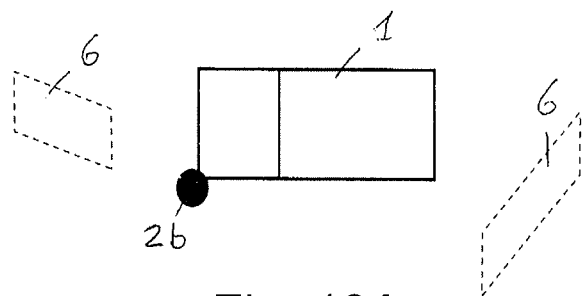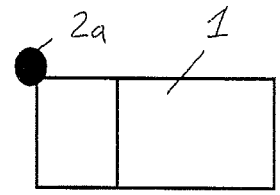
Fig. 13A                Fig. 13B
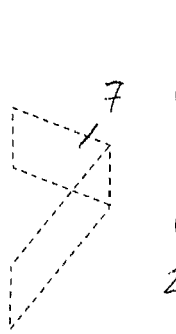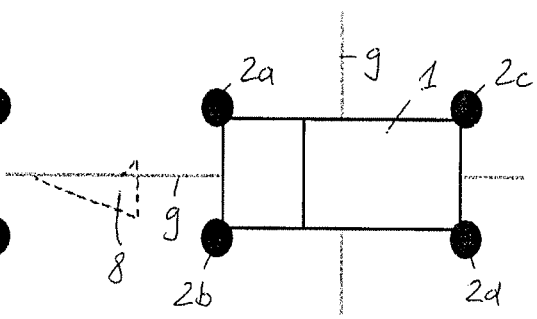
Fig. 13C                Fig. 13D
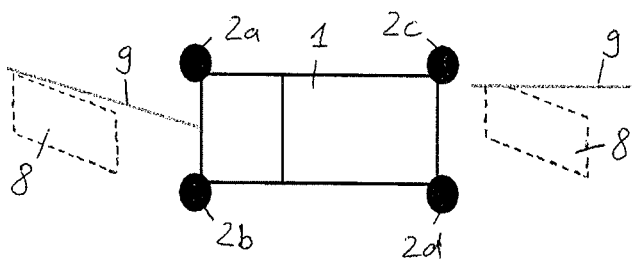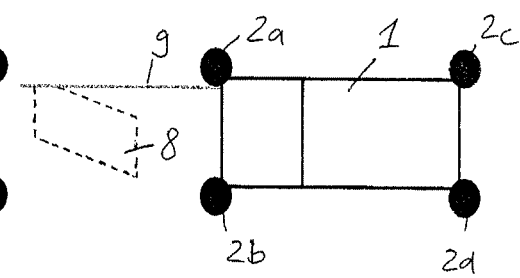
Fig. 13E                Fig. 13F

VEHICLE WITH SURROUNDINGS-MONITORING DEVICE AND METHOD FOR OPERATING SUCH A MONITORING DEVICE

CROSS REFERENCE TO RELATED APPLICATIONS

This application is a continuation of PCT International Application No. PCT/EP2015/063000, filed Jun. 11, 2015, which claims priority under 35 U.S.C. § 119 from German Patent Application No. 10 2014 108 684.8, filed Jun. 20, 2014, the entire disclosures of which are herein expressly incorporated by reference.

BACKGROUND AND SUMMARY OF THE INVENTION

The invention relates to a vehicle having a surroundings monitoring device, which monitors the surroundings of the vehicle, and contains an image capture device with at least two cameras which captures images of the surroundings of the vehicle, a first camera arrangement of the image capture device, in the case of which a first camera is arranged in the region of a first edge of the vehicle at which a first vehicle side surface and a vehicle front surface or a vehicle rear surface converge, and in the case of which a second camera is arranged in the region of a second edge, which differs from the first edge, of the vehicle at which a second vehicle side surface, which differs from the first vehicle side surface, and the vehicle front surface or the vehicle rear surface converge. The invention also relates to a method for operating a surroundings monitoring device of a vehicle.

A vehicle having a surroundings monitoring device of this type is known for example from DE 10 2012 014 448 A1. In DE 10 2012 014 448 A1, cameras are arranged in each case in the vicinity of a side door of a driver's cab of a utility vehicle and, as viewed in a longitudinal direction of the vehicle, approximately at the position of the side mirrors. The cameras, supplementing the side mirrors, capture images of objects which are situated to the rear in relation to the side mirrors and which are situated in the surroundings of the two side surfaces of the utility vehicle. The captured images are displayed by an image display device in the driver's cab.

The invention is based on the need for further developing an above-described vehicle having a surroundings monitoring device such that an improved monitoring result can be achieved with the least possible outlay. At the same time, there is a need to provide a method for operating a surroundings monitoring device, which method satisfies these requirements.

The invention is based on the concept whereby the first camera arrangement is furthermore arranged such that the image capture area of the first camera encompasses at least a part of the surroundings of the first vehicle side surface and at least a part of the surroundings of the vehicle front surface or at least a part of the surroundings of the vehicle rear surface, and the image capture area of the second camera encompasses at least a part of the surroundings of the second vehicle side surface and at least a part of the surroundings of the vehicle front surface or at least a part of the surroundings of the vehicle rear surface.

Here, the vehicle front surface is to be understood to mean the foremost surface of the vehicle in the direction of travel. In the case of a passenger motor vehicle with a "front nose", this is typically the front panel with front grille, and in the case of a heavy commercial vehicle with a driver's cab "without a nose", this is typically the front surface, which includes the windshield, of the driver's cab. Analogously, the vehicle rear surface is to be understood to mean the rearmost surface of the vehicle in the direction of travel. In the case of a passenger motor vehicle of typical "three-box design", this is the rear panel in the region of the luggage compartment, and in the case of a heavy commercial vehicle, this is for example a rear paneling of the body. In the case of tractor-trailer combinations which together likewise form a vehicle, the vehicle rear surface is then formed by a rear paneling of the trailer or semitrailer body.

Edges of the vehicle are to be understood to mean substantially vertical, edge-like lines of convergence, and also rounded lines of convergence, at which said vehicle surfaces converge on or with one another. The edges accordingly form lines or linear structures on the outer skin or the bodyshell of the vehicle at which the vehicle front surface and the vehicle rear surface transition into the two vehicle side surfaces with a change in direction.

By way of such an arrangement of merely two cameras, it is possible to monitor both the surroundings of the two side surfaces of the vehicle and the surroundings of the vehicle front surface or the surroundings of the vehicle rear surface. This results in a relatively large area of surroundings monitoring of the vehicle using only two cameras.

Furthermore, it is then the case that the first camera and the second camera, which are then arranged horizontally spaced apart from one another, interact as a stereo camera with regard to the surroundings of the vehicle front surface or of the vehicle rear surface, because then, the image capture area of the first camera and the image capture area of the second camera at least partially overlap in the surroundings of the vehicle front surface or in the surroundings of the vehicle rear surface. It is thus possible, by way of image data fusion, to generate a three-dimensional image of an object situated in the monitored surroundings, and/or for the distance of the object from the vehicle to be determined. Such a three-dimensional image is then preferably generated in an image evaluation device and displayed by way of the image display device.

Object identification by way of stereo image capture using at least two cameras generally requires less computational outlay in the two areas of the vehicle front surface and of the vehicle rear surface which are particularly critical with regard to collisions, than if the object identification is performed using only one camera. The stereo-camera-based object identification is preferably performed in combination with object identification algorithms, wherein each individual camera is assigned an object identification algorithm of said type in the image evaluation device. In this way, the robustness of the surroundings monitoring device is increased, because, in the event of a failure of one camera or of the object identification algorithm thereof, redundancy is provided in the form of the other camera or of the object identification algorithm thereof.

Furthermore, such an arrangement is advantageous under difficult light conditions, in the case of which, for example, the image provided by one camera is of poor quality, which can be compensated by the, in some cases, better quality of the image provided by the other camera.

Furthermore, it is then possible for blending masks, such as are used for the amalgamation ("stitching") of individual captured images, to be dynamically varied on the basis of the determined distance or the determined location of the object, in order to obtain an optimum view of an object in each case.

Advantageous refinements and improvements of the invention are described and claimed herein.

According to an embodiment of the invention, a first camera arrangement having a first camera and a second camera is provided, which first camera and second camera monitor the surroundings of the two side surfaces and, depending on positioning at the front or rear vehicle edges, additionally monitor the surroundings of the vehicle front surface or, alternatively, the surroundings of the vehicle rear surface.

To realize overall monitoring of the surroundings of the vehicle which is advantageous from numerous aspects, one refinement proposes a second camera arrangement of the image capture device, in the case of which a third camera is arranged at a third edge, which differs from the first and second edges, of the vehicle at which the first vehicle side surface and the vehicle front surface or a vehicle rear surface converge, and in the case of which a fourth camera is arranged at a fourth edge, which differs from the first, second and third edges, of the vehicle at which the second vehicle side surface and the vehicle front surface or the vehicle rear surface converge. The image capture area of the third camera encompasses at least a part of the surroundings of the first vehicle side surface and at least a part of the surroundings of the vehicle front surface, if the at least one part of the surroundings of the vehicle front surface is not encompassed by the image capture area of the first camera, or encompasses at least a part of the surroundings of the vehicle rear surface, if the at least one part of the surroundings of the vehicle rear surface is not encompassed by the image capture area of the first camera. And, the image capture area of the fourth camera encompasses at least a part of the surroundings of the second vehicle side surface and at least a part of the surroundings of the vehicle front surface, if the at least one part of the surroundings of the vehicle front surface is not encompassed by the image capture area of the second camera, or encompasses at least a part of the surroundings of the vehicle rear surface, if the at least one part of the surroundings of the vehicle rear surface is not encompassed by the image capture area of the second camera.

In other words, it is then the case that in each case one camera is provided at all four vehicle edges, the image capture areas of which cameras encompass in each case at least a part of the surroundings of a vehicle side surface and at least a part of the surroundings of the vehicle front surface or of the vehicle rear surface. Thus, all-round monitoring of the vehicle surroundings is possible with only four cameras.

It is particularly preferable for the first camera and the second camera and/or the third camera and the fourth camera to be arranged in each case in the region of a highest point on the respectively associated edge. In other words, said cameras are then arranged at the "upper corners" of the vehicle as viewed in a vertical direction.

It is then possible in particular to capture aerial-view images, that is to say images with a view from above in the vertical direction. Alternatively, panorama perspectives are however also possible.

This is realized for example in that the first image capture area and the second image capture area and/or the third image capture area and the fourth image capture area have in each case a central axis which has a vertical component. Since the image capture areas of cameras normally widen in a funnel shape or cone shape proceeding from the lens, a central axis of said type of an image capture area is to be understood to mean the central axis of the corresponding funnel or cone. In other words, the central axes of the image capture areas then point downward.

The images of downwardly directed cameras require less transformation outlay in order to generate an aerial perspective, because they are already directed downward, and therefore less perspective adaptation is necessary.

In one refinement, an image evaluation device of the surroundings monitoring device, into which image evaluation device the images captured by the cameras are input, is designed such that a) the images captured by the first camera device and/or by the second camera device and input into the image evaluation device are projected into the ground plane by way of a homographic transformation, b) based on the images projected into the ground plane, at least one object possibly situated in the surroundings of the vehicle is identified by way of integrated object identification algorithms, and the position of said object relative to the vehicle is determined, c) the images projected into the ground plane are amalgamated in a single representation, and said representation is generated as an aerial perspective, d) the aerial perspective is input into the image display device in order to be displayed there.

Said measures, in combination with the arrangement according to the invention of the cameras, make it possible, in particular during the "image stitching", that is to say during the amalgamation of images from several individual images to form one representation, for the position of the stitching axes to be able to be dynamically varied both in rotation and in translation in order to ensure a better representation of the identified object. More details in this regard will emerge from the following description of an exemplary embodiment.

It is also particularly preferable for a warning device to be provided which interacts with the image evaluation device such that a warning signal is generated if at least one identified object undershoots a predefined minimum distance to the respective vehicle surface or to the vehicle.

If, in the case of the above-described surroundings monitoring with at least two cameras or with four cameras, monitoring gaps arise in particular in the case of long vehicles, then on the first vehicle side surface and on the second vehicle side surface, there may additionally be arranged in each case at least one further camera which captures a surroundings area of the vehicle not captured by the image capture areas of the first camera and of the second camera and/or of the third camera and of the fourth camera.

The invention also relates to a method for operating a surroundings monitoring device of a vehicle, which surroundings monitoring device comprises at least one camera device, one image evaluation device and one image display device, comprising at least the following steps:

a) the camera device, which comprises at least two cameras which are arranged at vehicle edges of the vehicle and whose image capture areas encompass at least a part of the surroundings of a vehicle front surface or of a vehicle rear surface and at least a part of the surroundings of the two vehicle side surfaces, captures images of the surroundings of the vehicle and inputs signals representing said images into the image evaluation device, b) the images captured by the camera device and input into the image evaluation device are projected into the ground plane by way of a homographic transformation, c) based on the images projected into the ground plane, at least one object possibly situated in the surroundings of the vehicle is identified by way of integrated object identification algorithms, and the position of said object relative to the vehicle is determined, d) the images projected into the ground plane are amalgamated in a single representation, and said representation is generated as an aerial perspective, e) the aerial perspective is input into the image display device in order to be displayed there.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 6A-6D show schematic plan views of the vehicle having the surroundings monitoring device according to the prior art as per FIG. 1, showing blending of images captured by different cameras as an aerial perspective.

FIGS. 13A-13F show schematic plan views of the vehicle having the first and the second camera device of the surroundings monitoring device of FIG. 7, showing blending of images captured by different cameras as an aerial perspective.

DETAILED DESCRIPTION OF THE DRAWINGS

Figure 1:
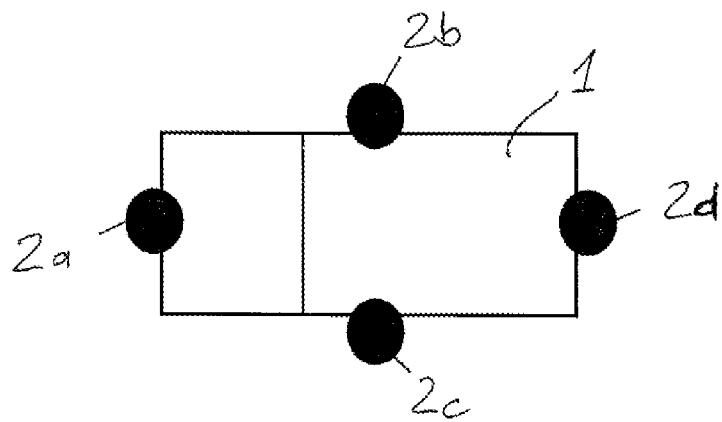
FIG. 1 shows a schematic plan view of a vehicle having a surroundings monitoring device according to the prior art, with in each case one camera on the two vehicle side surfaces and in each case one camera on the vehicle front surface and on the vehicle rear surface.

FIG. 1 shows a schematic plan view of a commercial vehicle 1 having a surroundings monitoring device 100 according to the prior art, having one camera 2a on the vehicle front surface, in each case one camera 2b, 2c on the two vehicle side surfaces 10, 12 and one camera 2d on the vehicle rear surface 16.

Figure 2:
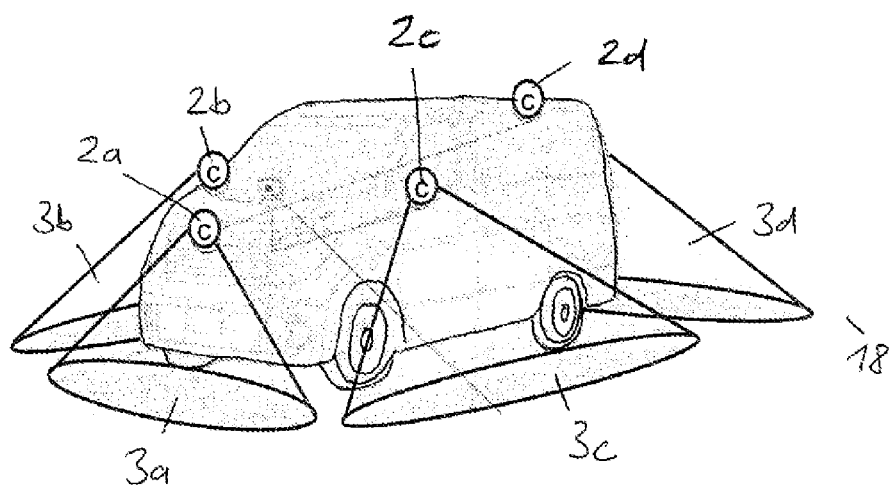
FIG. 2 is a perspective illustration of the vehicle having the surroundings monitoring device according to the prior art as per FIG. 1, showing the image capture areas of the four cameras.

FIG. 2 shows a perspective illustration of the commercial vehicle 1 having the surroundings monitoring device 100 according to the prior art as per FIG. 1, showing image capture areas 3a to 3d of the four cameras 2a to 2d. Accordingly, the image capture areas 3a to 3d extend in each case in cone-shaped or funnel-shaped form obliquely downward from the respective camera 2a to 2d to the ground contact surface 18 of the utility vehicle 1 or toward the ground surface 18.

Figure 3:
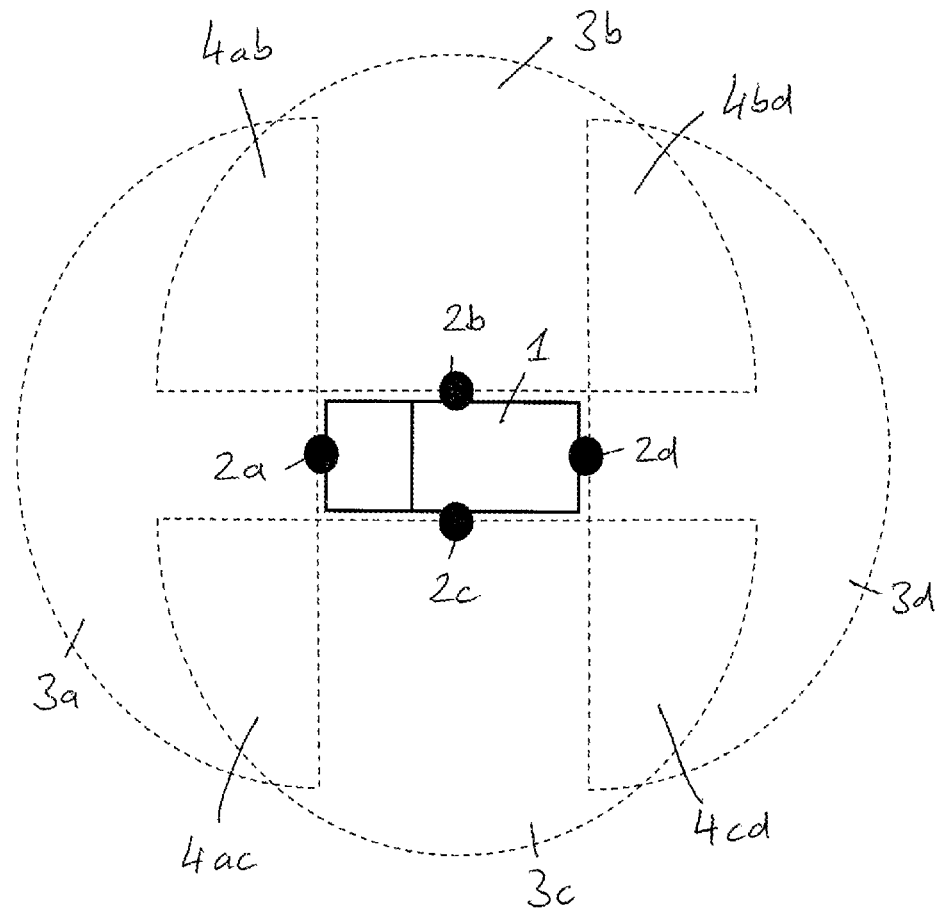
FIG. 3 shows a schematic plan view of the vehicle having the surroundings monitoring device according to the prior art as per FIG. 1, showing the image capture areas of the four cameras.

As can be seen from FIG. 3, which shows the projections of the image capture areas 3a to 3d3 onto the ground contact surface 18, the image capture areas 3a to 3d of the four cameras 2a to 2d may overlap at the vehicle edges or vehicle corner regions in overlap areas 4ab, 4bd, 4cd and 4ac. However, said overlap areas 4ab, 4bd, 4cd and 4ac are restricted only to the edge regions of the commercial vehicle 1, as can also be seen from FIG. 4. Stereo images, that is to say images captured in parallel by at least two cameras 2a to 2d, are then possible only in said overlap areas 4ab, 4bd, 4cd and 4ac at the vehicle edges, which overlap areas together form a stereo capture area 5.

Figure 4:
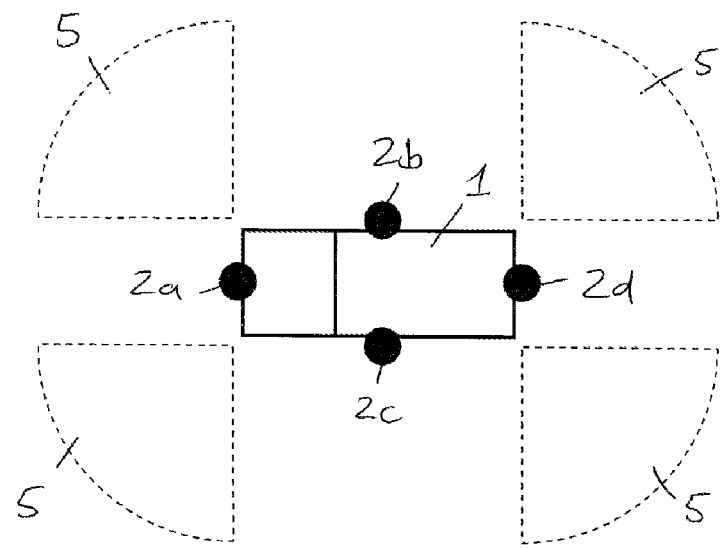
FIG. 4 shows a schematic plan view of the vehicle having the surroundings monitoring device according to the prior art as per FIG. 1, showing possible overlaps of the image capture areas of the four cameras for the purposes of generating stereo images.
Figure 5:
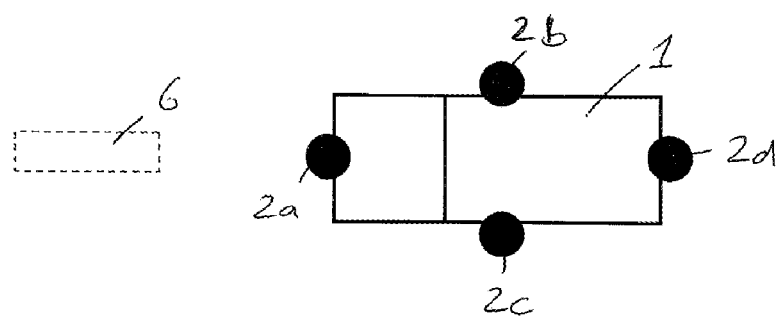
FIG. 5 shows a schematic plan view of the vehicle having the surroundings monitoring device according to the prior art as per FIG. 1, showing an aerial perspective of an object captured by way of a front camera.

FIG. 5 shows a schematic plan view of the commercial vehicle 1 having the surroundings monitoring device 100 according to the prior art as per FIG. 1, showing an aerial perspective 6 of an object captured by way of only the front camera 2a, said object being situated approximately centrally in front of the vehicle front surface 14 of the commercial vehicle 1 and thus not being situated in the stereo capture area 5, situated at the vehicle edge, as per FIG. 4. Thus, capturing of a stereo image of the object is not possible.

FIG. 6A to FIG. 6D show schematic plan views of the commercial vehicle 1 having the surroundings monitoring device 100 according to the prior art as per FIG. 1, showing blending of images of an object captured by two cameras 2a and 2b as an aerial perspective 6. In this case, the object is situated in an overlap area 4ac or in a stereo capture area 5 of both of the two cameras, specifically of the camera 2b on the first vehicle side surface 10 (FIG. 6A) and a camera 2a on the vehicle front surface 14 (FIG. 6B), wherein the image captured by the respective camera 2a and 2b is shown in each case as an aerial perspective 6.

FIG. 6C shows the stereo image 7 of the images captured by the two cameras 2a and 2b, and FIG. 6D shows an aerial perspective 8 of the images amalgamated along a blending axis 9 (stitching). As can be seen from FIG. 6D, the aerial perspective 8 of the object 6 is incomplete, because a part is lost during the blending or stitching. Consequently, the object can be identified only with difficulty.

With the preferred exemplary embodiment of the invention described below, the disadvantages that exist in the case or the above-described prior art are avoided.

Figure 7:
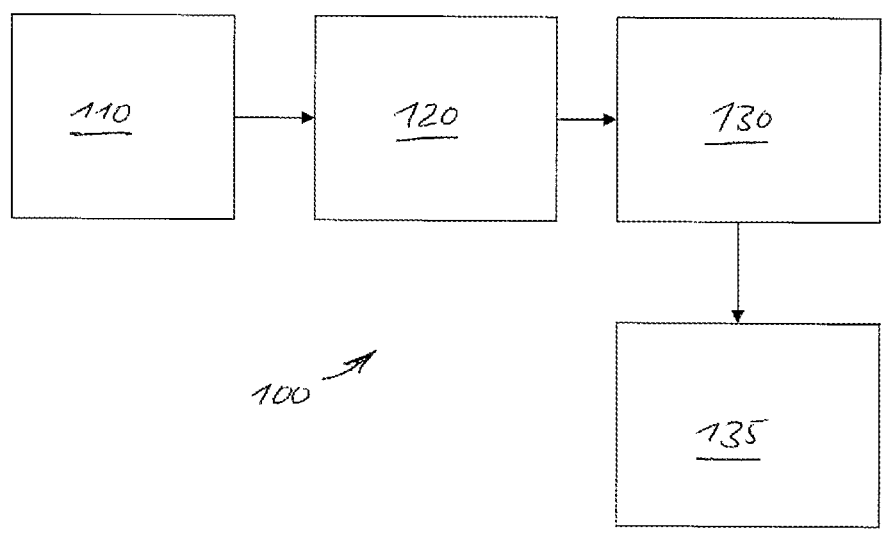
FIG. 7 is a highly schematic illustration of a surroundings monitoring device of a vehicle as per a preferred embodiment of the invention.

FIG. 7 shows a highly schematic illustration of a surroundings monitoring device 100 as per a preferred embodiment of the invention, such as is arranged in this case for example on a heavy commercial vehicle 1. The surroundings monitoring device has an image capture device 110 for capturing images of objects situated in the surroundings of the commercial vehicle 1, which image capture device inputs image signals, which represent the images of said objects, into an image evaluation device 120. After evaluation or processing of the image signals, which is yet to be described below, corresponding images of the captured objects are displayed on an image display device 130, such as for example a monitor arranged in a driver's cab 140 of the commercial vehicle 1.

Figure 8:
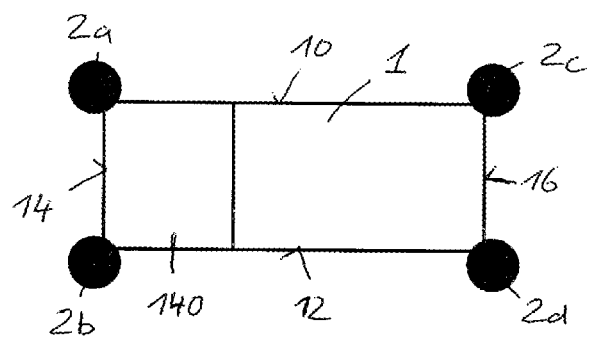
FIG. 8 shows a schematic plan view of a vehicle having a first and a second camera device of the surroundings monitoring device of FIG. 7, as per a preferred embodiment of the invention having in each case one camera at each outer edge of the vehicle.

FIG. 8 shows a schematic plan view of the commercial vehicle 1 having a first and a second camera device of the surroundings monitoring device 100 of FIG. 7, as per a preferred embodiment of the invention having in each case one camera 2a to 2d at each outer edge of the commercial vehicle 1.

Figure 9:
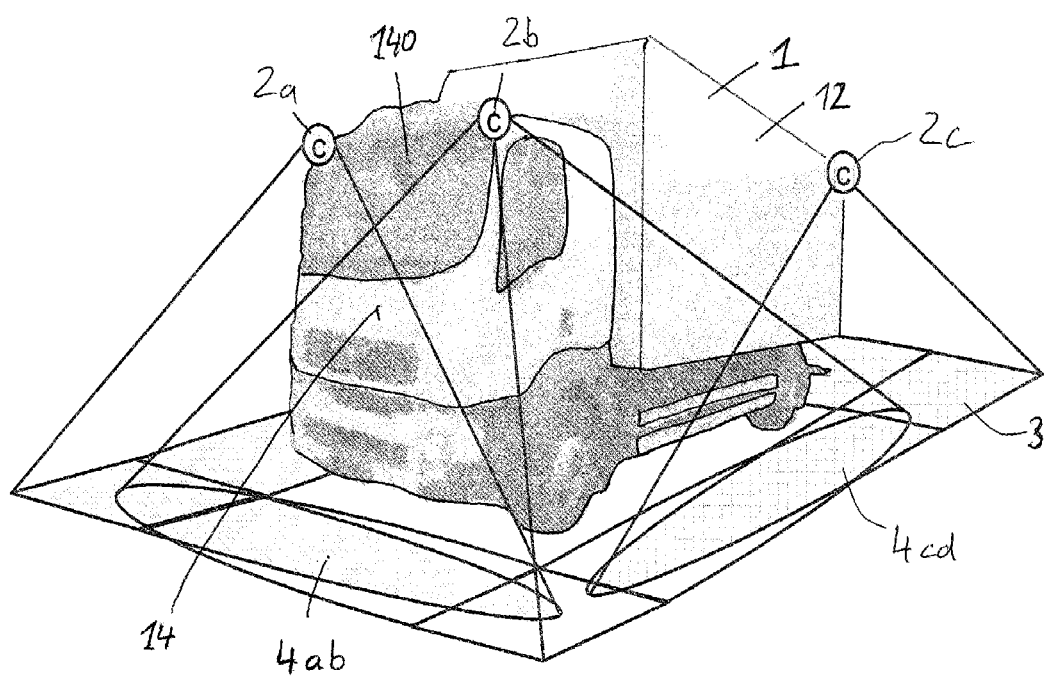
FIG. 9 is a perspective illustration of the vehicle having the first and the second camera device of the surroundings monitoring device of FIG. 7, showing the image capture areas of the four cameras.

As is easily contemplated on the basis of FIG. 8 and FIG. 9, the projection area, schematically shown in FIG. 8, of the commercial vehicle onto the ground surface is approximately rectangular, and therefore has transition edges at the transitions between a vehicle front surface 14 and the two vehicle side surfaces 10, 12 and between the latter and a vehicle rear surface 16.

Such transition or vehicle edges are therefore to be understood to mean substantially vertical and edge-like lines of convergence, and also rounded lines of convergence, at which the vehicle front surface 14 converges on or transitions into the two vehicle side surfaces 10, 12, and the latter converge on or transition into the vehicle rear surface 16. Accordingly, the vehicle edges form lines or linear structures on the outer skin or the bodyshell of the commercial vehicle at which the vehicle front surface 14 and the vehicle rear surface 16 transition into the two vehicle side surfaces 10, 12 with a change in direction, for example of 90 degrees.

In the case of a first camera arrangement of the image capture device, as per FIG. 8, a first camera 2a is arranged in the region of a first edge of the commercial vehicle 1, at which the first vehicle side surface 10 and the vehicle front surface 14 converge, and in the case of which a second camera 2b is arranged in the region of a second edge, which differs from the first edge, of the commercial vehicle 1 at which a second vehicle side surface 12, which differs from the first vehicle side surface 10, and the vehicle front surface 14 converge.

Figure 10:
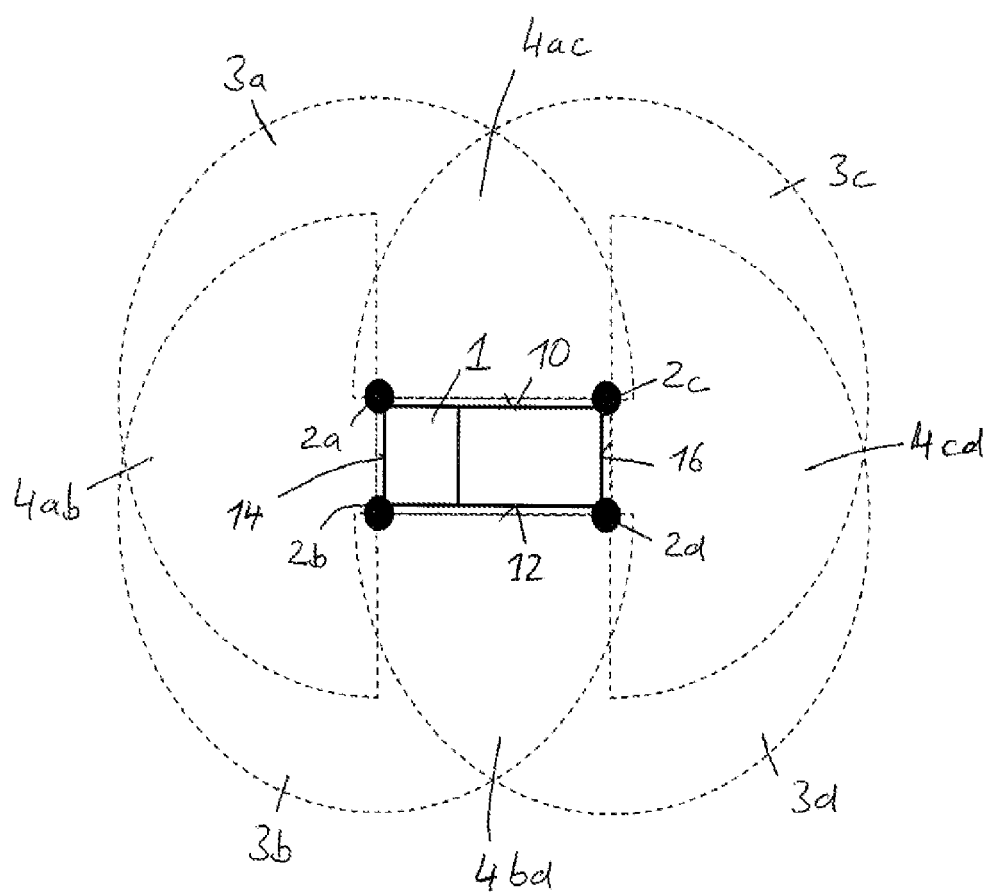
FIG. 10 shows a schematic plan view of the vehicle having the first and the second camera device of the surroundings monitoring device of FIG. 7, showing the image capture areas of the four cameras.

As can be seen from FIG. 9 and FIG. 10, the image capture area 3a of the first camera 2a encompasses at least a part of the surroundings of the first vehicle side surface 10 and at least a part of the surroundings of the vehicle front surface 14, and the image capture area 3b of the second camera 2b encompasses at least a part of the surroundings of the second vehicle side surface 12 and at least a part of the surroundings of the vehicle front surface 14.

Furthermore, the image capture device 110 also comprises a second camera device, in the case of which a third camera 2c is arranged at a third edge, which differs from the first and second edges, of the commercial vehicle at which the first vehicle side surface 10 and the vehicle rear surface 16 converge, and in the case of which a fourth camera 2d is arranged at a fourth edge, which differs from the first, second and third edges, of the commercial vehicle 1 at which the second vehicle side surface 12 and the vehicle rear surface 16 converge.

Here, the image capture area 3c of the third camera 2c encompasses at least a part of the surroundings of the first vehicle side surface 10 and at least a part of the surroundings of the vehicle rear surface 16. The image capture area 3d of the fourth camera 2d encompasses at least a part of the surroundings of the second vehicle side surface 12 and at least a part of the surroundings of the vehicle rear surface 16.

Figure 11:
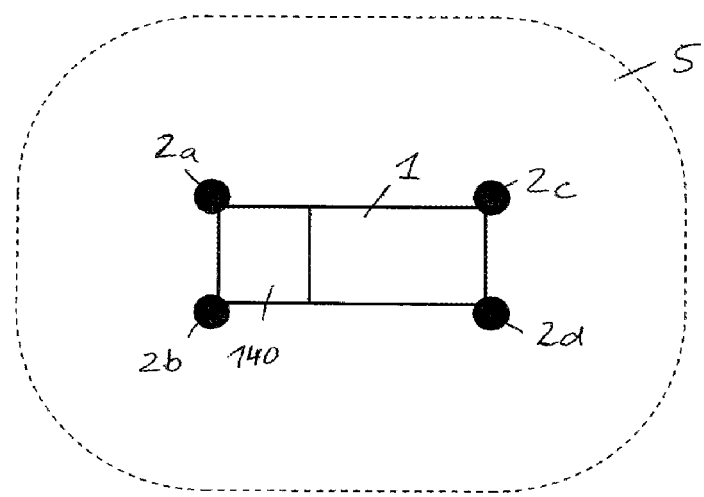
FIG. 11 shows a schematic plan view of the vehicle having the first and the second camera device of the surroundings monitoring device of FIG. 7, showing the overlap areas of the image capture areas of the four cameras.

In other words, it is then the case that, at all four vehicle edges, there is provided in each case one camera 2a to 2d, the image capture areas 3a to 3d of which cameras encompass in each case at least a part of the surroundings of a vehicle side surface 10, 12 and at least a part of the surroundings of the vehicle front surface 14 or of the vehicle rear surface 16. Thus, all-round monitoring of the vehicle surroundings is possible with only four cameras, as emerges from FIG. 10, which shows the overlap areas 4ab, 4ac, 4bd and 4cd in which images can be captured by at least two cameras. Said overlap areas 4ab, 4ac, 4bd and 4cd together form an image capture area 5 of the four cameras 2a to 2d in which stereo capturing of objects by way of in each case at least two cameras is possible, and which is illustrated in idealized form in FIG. 11.

In alternative embodiments, it is also possible for only a first camera device having a first camera 2a and having a second camera 2b at the two front vehicle edges or only a second camera device having a third camera 2c and having a fourth camera 2d at the two rear vehicle edges to be provided, wherein it is then consequently the case that either the front surroundings and the two side surroundings or the rear surroundings and the two side surroundings of the commercial vehicle 1 are monitored.

As emerges in particular from FIG. 9, four cameras 2a to 2d are preferably arranged in each case in the region of a highest point on the respectively associated vehicle edge. In other words, said cameras 2a to 2d are then arranged at the "upper corners" of the commercial vehicle 1 as viewed in a vertical direction. It is then possible in particular to capture aerial-view images, that is to say images with a view from above in the vertical direction.

If it is assumed that the funnel-shaped or cone-shaped image capture areas 3a to 3d have in each case one imaginary central axis, said central axes then, when viewed as a vector, have in each case one vertical component. In other words, the central axes of the image capture areas 3a to 3d of the four cameras 2a to 2d then point downward.

Figure 12:
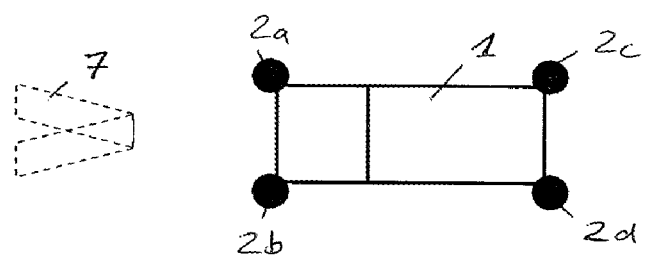
FIG. 12 shows a schematic plan view of the vehicle having the first and the second camera device of the surroundings monitoring device of FIG. 7, showing aerial perspectives of an object recorded by way of the two front cameras.

FIG. 12 shows stereo capturing of an object, situated in front of the vehicle front surface 14 of the commercial vehicle 1, captured by way of the two front cameras 2a and 2b as an aerial perspective 7. The aerial perspective 7 is thus made up of two representations of an object from different viewing angles or viewing directions.

FIGS. 13A to 13F show the step-by-step approach used for the image evaluation, based on the example of FIG. 12.

FIG. 13A shows a representation of the object 6 as provided by the front-left camera 2b, and FIG. 13B shows a representation of the object 6 as provided by the front-right camera 2a.

FIG. 13C shows the overlap or the stereo image formed from the representations of the two cameras 2a and 2b as an aerial perspective 7.

FIG. 13D shows, in an aerial perspective, a single representation 8 which has arisen by amalgamation (blending or stitching) of the individual images of the object 6 from the two cameras 2a and 2b, wherein the visible part is shown by way of a thick dashed line and the non-visible part is shown by way of a thin dashed line. The blending axis 9 is in this case situated centrally between the two cameras 2a and 2b, and is perpendicular to the vehicle front surface 14.

To obtain an improved single representation 8 of the object 6 in the aerial perspective, the blending axis 9 has firstly, as per FIG. 13E, been dynamically rotated and then, as per FIG. 13F, displaced in this case for example to the right by dynamic translation.

Figure 14A:
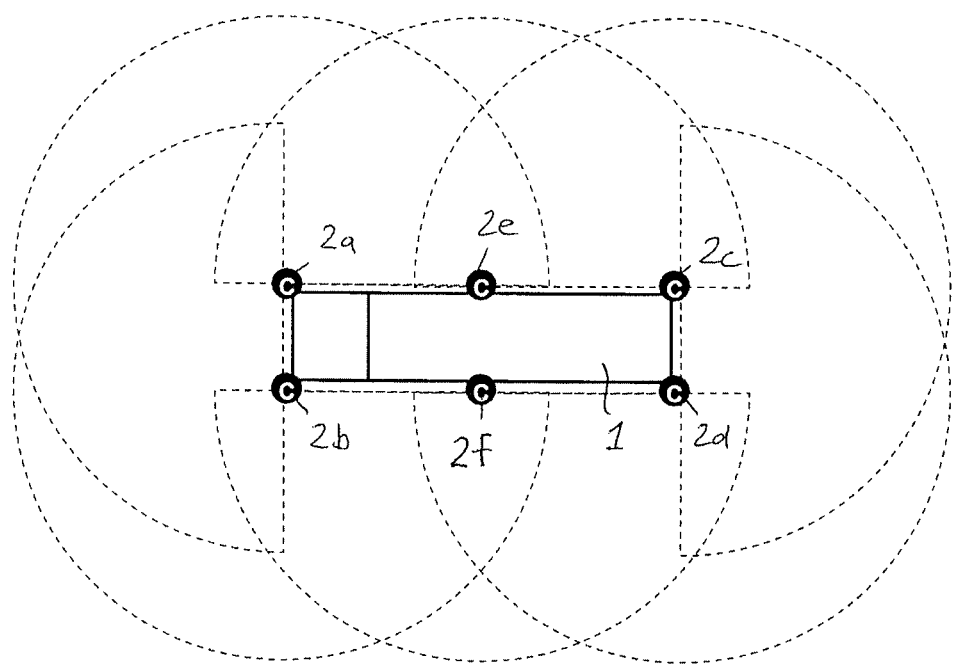
FIGS. 14A and 14B show schematic plan views of the vehicle having the first and the second camera device of the surroundings monitoring device of FIG. 7, and having further cameras arranged at the sides.
Figure 14B:
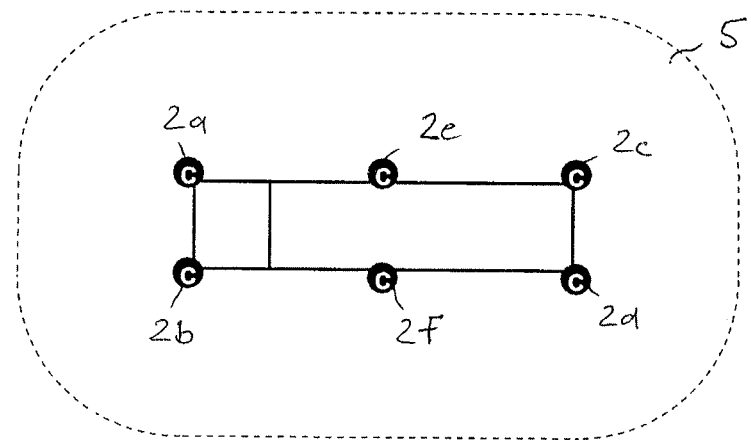

If, in the case of the above-described surroundings monitoring with four cameras 2a to 2d, monitoring gaps arise in particular in the case of long vehicles, then as per the embodiment shown in FIG. 14A and FIG. 14B, on the first vehicle side surface 10 and on the second vehicle side surface 12, there may additionally be arranged in each case one further camera 2e and 2f respectively which captures a surroundings area of the utility vehicle 1 not capturable by the image capture areas of the originally four cameras 2a to 2d. This embodiment relates to particularly long vehicles or vehicle combinations such as tractor-trailer combinations or tractor-semitrailer combinations. FIG. 14A shows the image capture areas 3 of the then, for example, six cameras 2a to 2f, and FIG. 14B shows, in idealized form, the stereo capture area 5 of said six cameras 2a to 2f.

In addition to the four cameras 2a to 2d arranged at the vehicle edges, it is possible for any desired number of further cameras to be arranged on all surfaces of the commercial vehicle and in particular on the vehicle side surfaces 10, 12, on the vehicle front surface 14 and on the vehicle rear surface 16.

Figure 15:
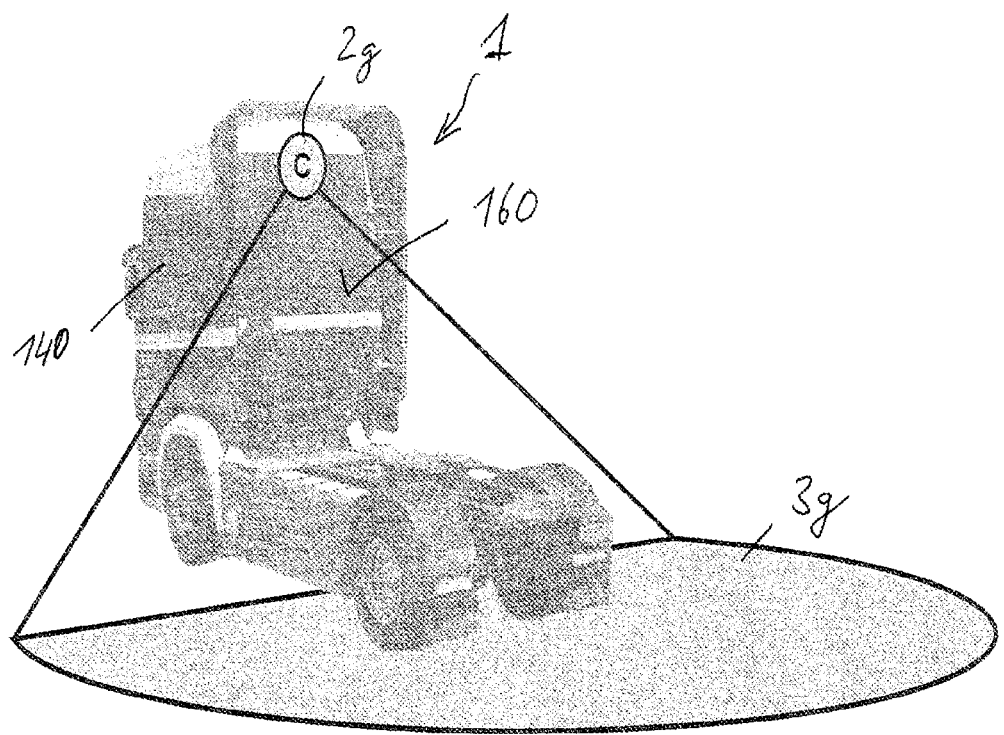
FIG. 15 shows a perspective view of a tractor vehicle of a tractor-trailer combination without a trailer or semitrailer, in the case of which an additional camera for monitoring the rear area is arranged on a rear surface of the driver's cab.

FIG. 15 shows, by way of example, an embodiment with an additional camera 2g on a rear wall of the driver's cab 140 of the tractor vehicle 1 without a coupled-on semitrailer, the image capture area 3g of which additional camera in this case for example captures the surroundings behind the driver's cab 140.

Figure 16:
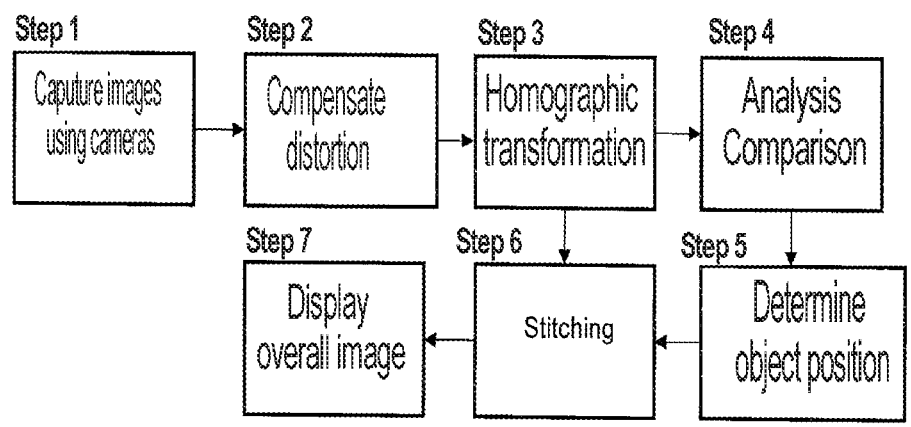
FIG. 16 shows a flow diagram of steps of a preferred embodiment of a method which are executed by the surroundings monitoring device according to the invention.

FIG. 16 shows a flow diagram of steps of a preferred embodiment of a method which are executed by the above-described surroundings monitoring device 100.

As per step 1 of FIG. 16, at least one camera device, for example with fish-eye lenses, is used to capture images of the surroundings of the vehicle. Here, the camera device comprises at least two cameras which are arranged at vehicle edges of the vehicle and whose image capture areas encompass at least a part of the surroundings of a vehicle front surface or of a vehicle rear surface and at least a part of the surroundings of the two vehicle side surfaces. Signals representing the captured images are then input into an image evaluation device.

In step 2, it is for example the case that the distortion of the fish-eye lenses is compensated in the image evaluation device.

In step 3, the images, compensated with regard to distortion, are subject to a homographic transformation in order to transform the images into a ground contact surface of the vehicle or into the ground surface.

Then (step 4), the images transformed into the ground surface are analyzed, in particular compared with one another, in the image evaluation device. The evaluation or analysis of the images is for example performed with regard to whether the images projected into the ground surface 18 differ, and if so, whether it is then the case that at least one three-dimensional object with a height projecting above the ground surface 18 is situated within the image capture areas 3a to 3d of the cameras 2a to 2d. This is because, in this case, an object also appears in different representations from different capture angles such as are provided by multiple cameras 2a to 2d, as has already been illustrated above in FIG. 13C. If not, then it is assumed that no three-dimensional object is situated in the image capture areas 3a to 3d of the cameras 2a to 2d.

Then, in step 5, the position of the identified object or of the identified objects in the surroundings of the vehicle is determined from the captured stereo images projected onto the ground surface and from the different representations (viewing angles) from the different cameras.

Then, in step 6, the images projected onto the ground surface are amalgamated into a single image (stitching or blending) in order to obtain an aerial perspective of the entire surroundings of the vehicle. At the same time, depending on the determined position of the object or depending on the determined positions of the identified objects, it is also possible for a warning signal to be generated if necessary.

The execution of steps 2 to 6, which relate to the evaluation of the images captured in step 1, is performed in the image evaluation device 120 (see FIG. 7), which may be a microprocessor-based device.

Finally, in a step 7, the individual images amalgamated to form a single representation (stitching or blending) are displayed by way of the image display device 130, for example on a monitor in the driver's cab 140. Here, it is additionally also possible for the warning signal to be output visually and/or acoustically.

In summary, the method as per FIG. 16 therefore comprises at least the following steps:

a) At least one image capture device 110, which comprises at least two cameras 2a, 2b and 2c, 2d which are arranged at vehicle edges of the vehicle and whose image capture areas 3a, 3b and 3c, 3d encompass at least a part of the surroundings of a vehicle front surface 14 or of a vehicle rear surface 16 and at least a part of the surroundings of the two vehicle side surfaces 10, 12, captures images of the surroundings of the vehicle 1 and inputs signals representing said images into an image evaluation device 120.

b) The images captured by the image capture device 110 and input into the image evaluation device 120 are projected into the ground plane 18 by way of a homographic transformation.

c) Based on the images projected into the ground plane 18, at least one object 6 situated in the surroundings of the vehicle is identified by way of integrated object identification algorithms, and the position of said object relative to the vehicle 1 is determined.

d) The images projected into the ground plane 18 are amalgamated in a single representation 8 ("stitched"), and said representation 8 is generated as an aerial perspective.

e) The aerial perspective 8 is input into the image display device 130 in order to be displayed there.

f) Depending on the determined position of an identified object 6, a warning signal is generated.

The warning device 135 (FIG. 7) then interacts with the image evaluation device 120 such that the warning signal is generated if at least one identified object 6 undershoots a predefined minimum distance to the respective vehicle surface 10 to 16 or to the vehicle 1.

The above step f) and the warning device 135 are merely optional, and are provided for example in the context of a driver assistance system. By contrast, it may be sufficient if the driver can assess whether or not a risk of collision exists on the basis of the (all-round) representation 8 shown on the image display device 130.

LIST OF REFERENCE DESIGNATIONS

1 Vehicle
2 Camera
3 Image capture area
4 Overlap area
5 Stereo recording area
6 Aerial perspective of a single camera
7 Stereo image of at least two cameras
8 Display of amalgamated images
9 Blending axis
10 First vehicle side surface
12 Second vehicle side surface
14 Vehicle front surface
16 Vehicle rear surface
100 Surroundings monitoring device
110 Image capture device
120 Image evaluation device
130 Image display device
135 Warning device
140 Driver's cab The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a surroundings monitoring device, which monitors surroundings of the vehicle, comprising
   an image capture device with at least two cameras which captures images of the surroundings of the vehicle and/or of the vehicle itself;
   a first camera arrangement of the image capture device, in the case of which a first camera is arranged in the region of a first edge of the vehicle at which a first vehicle side surface and a vehicle front surface or a vehicle rear surface converge, and in the case of which a second camera is arranged in the region of a second edge, which differs from the first edge, of the vehicle at which a second vehicle side surface, which differs from the first vehicle side surface, and the vehicle front surface or the vehicle rear surface converge; and
   an image evaluation device having individual object identification algorithms assigned to each camera,
   wherein
      the first camera arrangement is further arranged such that the image capture area of the first camera encompasses at least a part of surroundings of the first vehicle side surface between planes containing the front and rear surfaces of the vehicle, the image capture area of the second camera encompasses at least a part of surroundings of the second vehicle side surface between the planes containing the front and rear surfaces of the vehicle, and the image capture areas of the first and second cameras encompass at least a part of the surroundings of the vehicle front surface or at least a part of the surroundings of the vehicle rear surface between planes containing the first or second side surfaces.

2. The vehicle as claimed in claim 1, further comprising:
   a second camera arrangement of the image capture device, in the case of which
   a) a third camera is arranged at a third edge, which differs from the first and second edges, of the vehicle at which the first vehicle side surface and the vehicle front surface or the vehicle rear surface converge, and in the case of which a fourth camera is arranged at a fourth edge, which differs from the first, second and third edges, of the vehicle at which the second vehicle side surface and the vehicle front surface or the vehicle rear surface converge, wherein
   b) the image capture area of the third camera encompasses at least a part of the surroundings of the first vehicle side surface and at least a part of the surroundings of the vehicle front surface, if the at least one part of the surroundings of the vehicle front surface is not encompassed by the image capture area of the first camera, or encompasses at least a part of the surroundings of the vehicle rear surface, if the at least one part of the surroundings of the vehicle rear surface is not encompassed by the image capture area of the first camera, and
   c) the image capture area of the fourth camera encompasses at least a part of the surroundings of the second vehicle side surface and at least a part of the surroundings of the vehicle front surface, if the at least one part of the surroundings of the vehicle front surface is not encompassed by the image capture area of the second camera, or encompasses at least a part of the surroundings of the vehicle rear surface, if the at least one part of the surroundings of the vehicle rear surface is not encompassed by the image capture area of the second camera.

3. The vehicle as claimed in claim 2, wherein
   the first camera, and the second camera, and/or the third camera and the fourth camera, are arranged in each case in the region of a highest point on the respectively associated edge.

4. The vehicle as claimed in claim 3, wherein
   the first image capture area and the second image capture area and/or the third image capture area and the fourth image capture area have in each case a central axis which has a vertical component.

5. The vehicle as claimed in claim 4, further comprising:
   the image evaluation device is further configured such that
   a) the images captured by the first camera device and/or by the second camera device and input into the image evaluation device are projected into the ground plane by way of a homographic transformation,
   b) based on the images projected into the ground plane, at least one object possibly situated in the surroundings of the vehicle is identified by way of integrated object identification algorithms, and the position of said object relative to the vehicle is determined,
   c) the images projected into the ground plane are amalgamated in a single representation, and said representation is generated as an aerial perspective,
   d) the aerial perspective is input into an image display device in order to be displayed.

6. The vehicle as claimed in claim 5, further comprising:
   a warning device which interacts with the image evaluation device such that a warning signal is generated if at least one identified object undershoots a predefined minimum distance to the respective vehicle surface or to the vehicle.

7. The vehicle as claimed in claim 1, wherein
the vehicle front surface forms the foremost surface of the vehicle and the vehicle rear surface forms the rearmost surface of the vehicle.

8. The vehicle as claimed in claim 1, wherein said vehicle is a commercial vehicle, and the vehicle front surface comprises a front surface of a driver's cab of the commercial vehicle.

9. The vehicle as claimed in claim 1, wherein the vehicle is a single vehicle or a vehicle combination.

10. The vehicle as claimed in claim 2, wherein
on the first vehicle side surface and on the second vehicle side surface, there is additionally arranged in each case at least one further camera which captures a surroundings area of the vehicle not captured by the image capture areas of the first camera and of the second camera and/or of the third camera and of the fourth camera.

11. The vehicle as claimed in claim 1, wherein
the first camera and the second camera are arranged in each case in the region of a highest point on the respectively associated edge.

12. The vehicle as claimed in claim 11, wherein
the first image capture area and the second image capture area have in each case a central axis which has a vertical component.

13. The vehicle as claimed in claim 12, further comprising:
an image evaluation device which is designed such that
a) the images captured by the first camera device and/or by the second camera device and input into the image evaluation device are projected into the ground plane by way of a homographic transformation,
b) based on the images projected into the ground plane, at least one object possibly situated in the surroundings of the vehicle is identified by way of integrated object identification algorithms, and the position of said object relative to the vehicle is determined,
c) the images projected into the ground plane are amalgamated in a single representation, and said representation is generated as an aerial perspective,
d) the aerial perspective is input into an image display device in order to be displayed.

14. The vehicle as claimed in claim 13, further comprising:
a warning device which interacts with the image evaluation device such that a warning signal is generated if at least one identified object undershoots a predefined minimum distance to the respective vehicle surface or to the vehicle.

15. A method for operating a surroundings monitoring device of a vehicle, which surroundings monitoring device comprises at least one image capture device, one image evaluation device and one image display device, the method comprising the steps of:
a) the image capture device comprises at least two cameras which are arranged at vehicle edges of the vehicle and whose image capture areas encompass at least a part of surroundings of a vehicle front surface between planes containing the vehicle front surface and a vehicle rear surface or of the vehicle rear surface between the planes containing the vehicle front surface and the vehicle rear surface, and at least a part of surroundings of two vehicle side surfaces between planes containing the front and rear surfaces of the vehicle, the image capture device being configured to capture images of the surroundings of the vehicle and input signals representing said images into the image evaluation device;
b) the images captured by the image capture device and input into the image evaluation device, the image evaluation device having individual object identification algorithms for each camera, are projected into the ground plane by way of a homographic transformation;
c) based on the images projected into the ground plane, at least one object possibly situated in the surroundings of the vehicle is identified by way of the individual object identification algorithms, and the position of said object relative to the vehicle is determined;
d) the images projected into the ground plane are amalgamated in a single representation, and said representation is generated as an aerial perspective;
e) the aerial perspective is input into the image display device in order to be displayed.

* * * * *